Dec. 16, 1952 J. W. WILKINSON 2,621,796
OIL FILTER

Filed Feb. 9, 1948 3 Sheets-Sheet 1

INVENTOR.
James W. Wilkinson
BY
ATTORNEY.

Dec. 16, 1952 — J. W. WILKINSON — 2,621,796
OIL FILTER
Filed Feb. 9, 1948 — 3 Sheets-Sheet 2
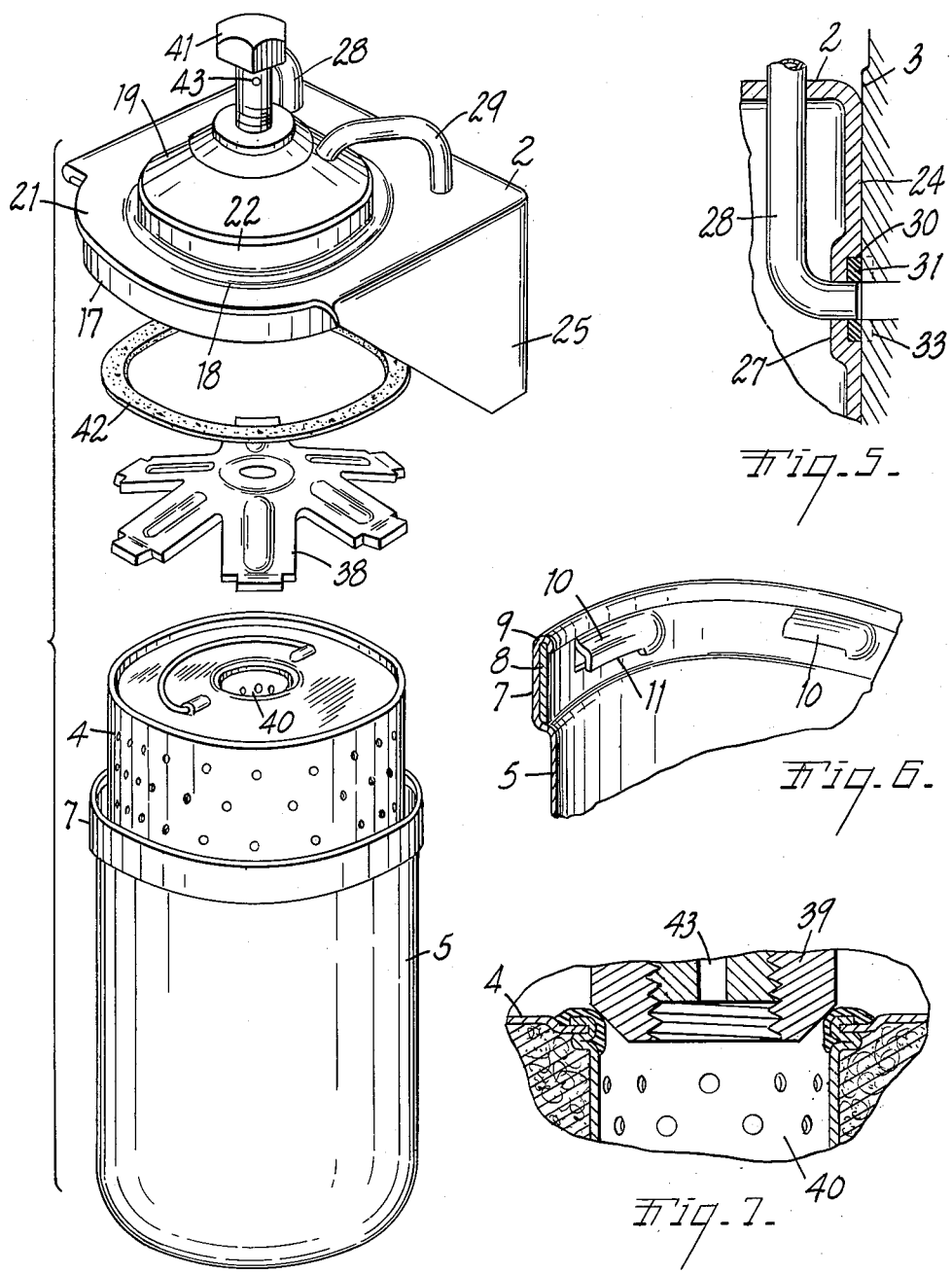
INVENTOR.
James W. Wilkinson
BY Otto A. Earl
ATTORNEY.

Dec. 16, 1952 J. W. WILKINSON 2,621,796
OIL FILTER
Filed Feb. 9, 1948 3 Sheets-Sheet 3
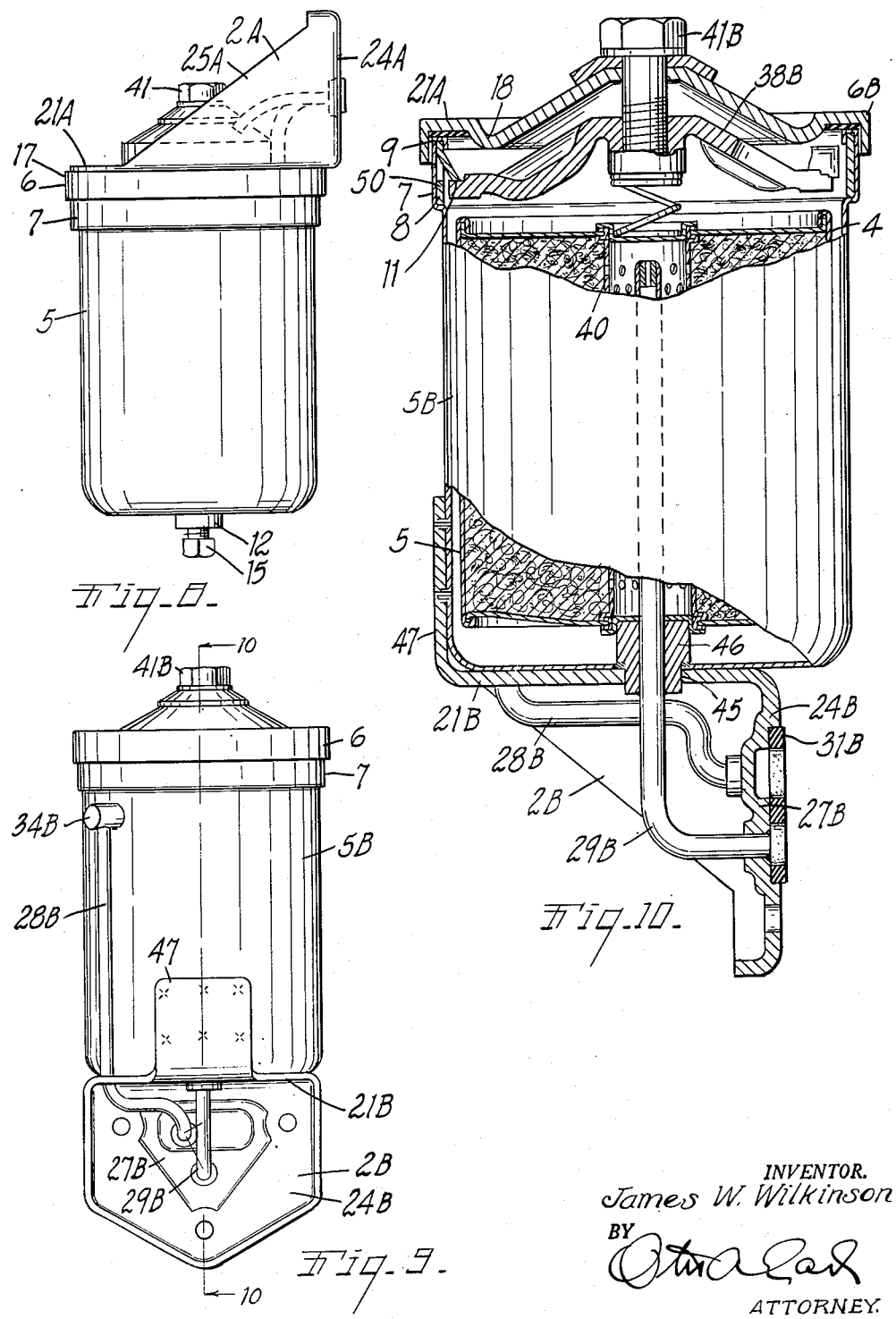
INVENTOR.
James W. Wilkinson
BY
[signature]
ATTORNEY.

Patented Dec. 16, 1952

2,621,796

UNITED STATES PATENT OFFICE 2,621,796

OIL FILTER

James W. Wilkinson, Hastings, Mich., assignor to Hastings Manufacturing Company, Hastings, Mich.

Application February 9, 1948, Serial No. 7,031

12 Claims. (Cl. 210—62)

This invention relates to improvements in oil filter and mounting bracket therefor.

The subject matter of this invention has been divided from my co-pending application Ser. No. 686,546, filed July 26, 1946, for Oil Filters now Patent No. 2,511,800 issued June 13, 1950.

The principal objects of this invention are:

First, to provide a container for the oil filter cartridge of an internal combustion engine and a mounting bracket for the container so arranged that the container may be manufactured of relatively thin and inexpensive sheet metal.

Second, to provide an oil filter and mounting bracket therefor in which the stresses incident to connecting the filter to an engine block and supporting the filter thereon are carried primarily by the mounting bracket and are not transmitted to the container of the filter.

Third, to provide an oil filter consisting of a separable two part container in which one part of the container including the connecting pipes or conduits for the filter is arranged to be permanently mounted on an internal combustion engine so that the other portion of the container is easily separable from the fixed portion for servicing the filter element of the oil filter.

Other objects and advantages pertaining to the details and economies of my invention will be apparent from a consideration of the following description and claims.

The drawings of which there are three sheets illustrate three forms of my oil filter container and mounting bracket for mounting the filter in different positions relative to the cylinder block of an engine.

Fig. 4 is an exploded perspective view of the filter shown in Fig. 1.

Fig. 5 is a fragmentary vertical cross sectional view along the line 5—5 in Fig. 2 and illustrating the connection between the oil feed conduit and the cylinder block.

Fig. 6 is a fragmentary inside perspective view of the body of a container shown in Fig. 1.

Fig. 7 is a fragmentary cross sectional view illustrating the oil return connection between the filter cartridge and the oil return passage of the container.

Fig. 8 is a side elevational view of a second form of my filter.

Fig. 9 is a front elevational view of a third form of my filter.

Fig. 10 is a side elevational view of the filter shown in Fig. 9 and partially broken away in vertical cross section along the line 10—10 in Fig. 9.

Figures 1, 2, 3:
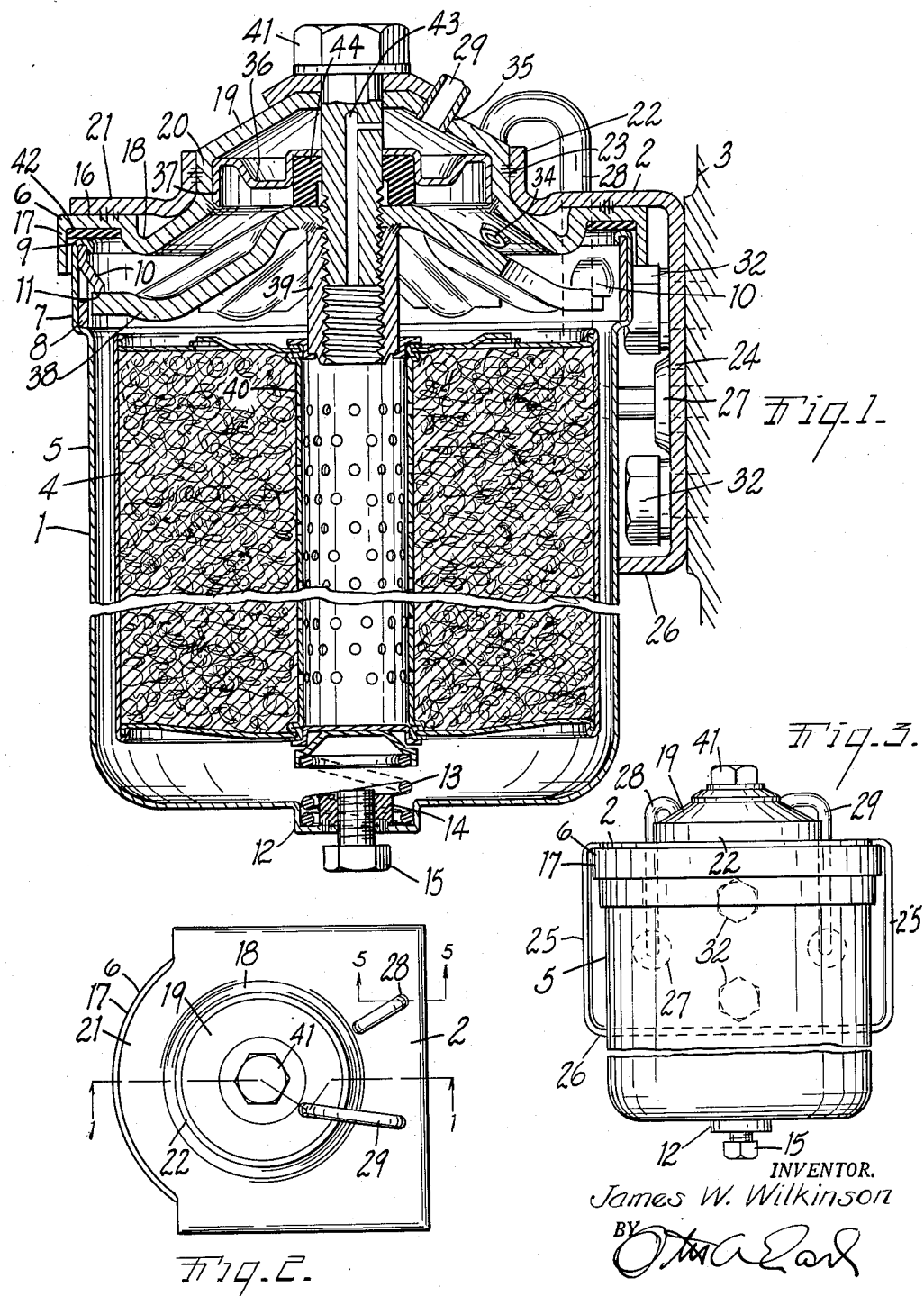
Fig. 1 is a vertical cross sectional view through the first form of my filter showing the filter mounted upon the cylinder block of an internal combustion engine, the section being taken along the line 1—1 in Fig. 2.
Fig. 2 is a plan view of the filter shown in Fig. 1.
Fig. 3 is a fragmentary front elevational view of the filter shown in Fig. 1.

All forms of my filter include a container generally indicated at 1 and a mounting bracket 2 for mounting the container on the block 3 of an internal combustion engine. The container is arranged to receive a filter cartridge 4 and more specifically consists of a generally cylindrical open top body 5 and a cover 6. The body and cover are separable to permit replacement of the cartridge 4. The body 5 is formed of relative light gauge sheet metal construction requiring sufficient strength only to resist the bursting pressure of the oil as it is pumped through the container. The upper end of the body 5 is enlarged as at 7 to receive the cylindrical reinforcing ring 8 and the top edge is rolled or seamed over the top of the ring as at 9 to retain the ring in place. The retaining ring 8 is provided with a series of inwardly pressed projections 10 having the downwardly facing edges 11 on the lower sides thereof.

The bottom of the body in the preferred form of my filter is provided with a cup shaped depression 12 which forms a retaining seat for the coiled spring 13. A centering plug 14 defining a drain hole closed by the screw 15 may be welded to the cup shaped depression if desired.

The cover member 6 is formed as a stamping from heavier gauge material than the walls of the body 5 and consists of a flat annular seat portion 16 surrounded by the cylindrical flange 17. Inwardly of the annular portion 16, the cover 6 is shaped into an annular stiffening rib 18 merging at its inner edges with the upwardly extending cup shaped portion 19 having a cylindrical lower wall 20.

The bracket 2 for mounting the first form of my filter consists of an upper plate 21 defining a central aperture with the upturned cylindrical flange 22 formed therearound. The flange 22 closely embraces the cylindrical portion 20 of the cup 19 and the plate 21 is lapped upon the annular seat portion 16 of the cover. The cover and bracket plate 21 are secured together by welding as at 23. The inner edge of the plate 21 is turned downwardly in an attaching flange 24 and triangular reinforcing flanges 25 connect the top plate and attaching flange of the bracket. A forwardly extending bottom flange 26 further stiffens the attaching flange 24 and helps to locate the body 5 with respect to the mounting bracket.

The attaching flange 24 of the mounting bracket is provided with forwardly pressed bosses 27 which define apertures for receiving the oil inlet tube 28 and outlet tube 29. The opposite sides of the bosses 27 form recesses 30 adapted to receive the oil resistant deformable synthetic rubber gaskets 31 for sealing the ends of the oil conduits to corresponding ports in the engine block. The attaching flange 24 further defines apertures for passing the cap screws 32 by means of which the bracket is secured to the motor block.

It will be noted from Fig. 5 that the gaskets 31 in their free and uncompressed position as indicated by the dotted lines at 33 extend beyond the rear face of the mounting flange 24 so that as the screws 32 are tightened the gaskets will be compressed into the recesses 30 to tightly seal the ends of the oil conduits to the side of the motor block around the oil ports.

The oil inlet pipe 28 extends upwardly through the top plate 21 of the mounting bracket and and then downwardly through the reinforcing rib 18 of the cover member to open into the space within the container as at 34 in Fig. 1. The oil outlet conduit 29 also extends upwardly through the top plate 21 and is then bent downwardly and extends through the top of the cup portion 19 as at 35 to also open into the interior of the container. A partition plate 36 having a cylindrical flange 37 is welded within the cylindrical portion 20 of the cap 19 to separate the inner ends of the inlet and outlet conduits.

Positioned within the upper end of the body 5 is a spider 38 having its arms engageable with the downwardly faced edges 11 on the bosses 10. The center of the spider carries an internally threaded sleeve 39, the lower end of which is arranged to engage the oil return tube 40 of the filter cartridge 4. A clamping screw 41 extends through the top of the cap portion 19 of the cover into the sleeve 39 so as to draw the spider 38, ring 8 and the upper edge 9 of the body member against the under side of the sealing ring 16. A gasket 42 of oil resistant synthetic rubber is positioned between the body and the cover.

The screw 41 defines a central oil outlet passage 43 communicating with the space above the partition 36 and a deformable synthetic rubber gasket 44 is positioned around the shank of the screw 41 to seal the screw to the partition 36. The lower end of the sleeve 39 engages the top of the oil return tube 40 as shown in Fig. 7 and more particularly described and claimed in my previously mentioned co-pending application.

From the foregoing description it should be apparent that the clamping forces required to obtain a good seal between the body and cover are carried exclusively by the cover ring portion 16 pressing against the reinforcing ring 8 and the arms of the spider 38 without placing any stress on the body 5. The deformable gasket 31 permits the bracket to be securely attached and sealed to the side of the cylinder block without the expense of accurately finishing the meeting surfaces of the bracket and cylinder block.

The second form of filter illustrated in Fig. 8 is substantially the same as that just described except that the attaching flange 24A of the bracket 2A is bent upwardly from the plate 21A and the triangular reinforcing flanges 25A will correspondingly bend upwardly from the cover 6 and the body 5. In other respects both forms of the filter are the same.

The third form of my invention illustrated in Figs. 9 and 10 is somewhat different from the other forms of the filter in that the mounting bracket 2B is secured to and arranged to support the bottom of the body 5B. The top plate 21B defines an aperture 45 arranged to receive the lower end of the boss 46 extending downwardly through the bottom of the body 5B. This locates the body on the bracket and an upturned arm 47 is provided on the bracket for further securing the body on the bracket. The cover 6B is similar to the first form of cover except that the cover 6B is not provided with the central cup portion and partition 36. The cover 6B is retained in place by means of the screw 41B engaged with a spider 38B which spider is in turn engaged with the reinforcing ring 10 within the top of the body 5B. The cap screw 41B has no oil passage in its shank.

The vertical attaching flange 24B of the bracket 2B is outwardly pressed or embossed as at 27B to form a recess on the rear side thereof to receive the gasket 31B. The oil inlet pipe 28B and oil outlet pipe 29B are attached to the embossed portion 27B as in the first form of the filter. The arrangement of the connections of the oil pipes to the attaching flange is slightly different than in the first two forms of the filter and it will be understood that the oil pipes can be connected to the attaching flange in any desired relative positions to correspond to the oil ports in the engine block to which the filter is to be attached. The oil inlet tube 28B extends upwardly through the top plate 21B and enters the side of the body 5B as at 34B in Fig. 9 and the oil outlet tube 29B is passed upwardly through the boss 46 to within the oil return chamber of the filter cartridge 4.

I have thus described three forms of my oil filter any one of which may be preferred to others depending upon the position of the oil ports in the motor block. Each form of my filter provides an easily separable container in which the sealing stresses are carried between the relatively rigid cover and the reinforcing ring in the relatively light body member. Each container is supported on the engine block by a stamped metal bracket having sufficient strength in itself to support the filter and the oil connecting pipes from the container to the motor block.

Each form of my filter is easily serviced by loosening a single screw which permits separation of the cover and body portions of the container for easy removal of the filter cartridge.

I have not attempted to describe other possible arrangements of my filter as it is believed that persons skilled in the art can adapt my filter in such various fashions as may be desired without further description.

Having thus described my invention what I claim as new and desire to secure by Letters Patent is:

1. In combination with an oil filter having spearable body and top members, a mounting bracket formed as a stamping and having a plate secured to one of said members, an attaching flange bent from the plane of said plate, side flanges connecting said plate and said attaching flange, a pressed out section in said attaching flange defining a port and a shouldered gasket seat therearound, a conduit connected to said flange around said port and extending through said plate and through the wall of one of said members, said conduit having a bend therein between said flange and said plate, and a gasket of compressible material positioned in said seat and extending beyond the face of said attaching flange in the uncompressed condition of said gasket.

2. In combination with an oil filter having a separable body and cup-shaped top, a mounting bracket formed as a stamping and having a plate defining an aperture, said top being secured to said plate and extending through said aperture, a mounting flange bent from said plate, side flanges connecting said plate and said mounting flange, a pressed out portion in said mounting flange defining a port and a recess therearound, a conduit connected to said flange and extending from said port through said plate and said top, said conduit having a bend therein between said flange and said plate, and a gasket of deformable material positioned in said recess and around said port.

3. An oil filter comprising a relatively light gauge container member, a relatively heavy gauge cover member, a stamped bracket having a horizontal flange secured to one of said members, a vertical flange on said bracket defining a pair of ports and arranged to be connected to an engine block, a reinforcing ring mounted within the open end of said container member, a spider member engageable with said ring, screw means extending between said spider and said cover member for clamping said container member and cover member together, and oil conduits extending from said ports through said horizontal flange to within said filter.

4. In combination with an oil filter having separable body and top members, a mounting bracket having a plate secured to one of said members, an attaching flange bent from the plane of said plate, side flanges connecting said plate and said attaching flange, a pressed out section in said attaching flange defining a port and a shouldered gasket seat therearound, a conduit connected to said port and extending through said plate and the wall of said one of said members, and a gasket of compressible material positioned in said seat and extending beyond the face of said attaching flange in the uncompressed condition of said gasket.

5. In combination with an oil filter having separable body and top members, a mounting bracket having a plate secured to one of said members, an attaching flange bent from the plane of said plate, side flanges connecting said plate and said attaching flange, a pressed out section in said attaching flange defining a port and a shouldered gasket seat therearound, a conduit connected to said flange around said port and extending through said plate and the wall of said body member, said conduit having a bend therein between said flange and said plate, and a gasket of compressible material positioned in said seat and extending beyond the face of said attaching flange in the uncompressed condition of said gasket.

6. In combination with an oil filter having a separable relatively thin body and relatively thick cup-shaped top, a mounting bracket having a plate defining an aperture, said top being permanently secured to said plate and with the cupped portion of said top extending through said aperture, a mounting flange bent normally from said plate, side flanges connecting said plate and said mounting flange, a pressed out portion in said mounting flange defining a port and a recess therearound, a conduit connected to said flange and extending from said port through said plate and through the cupped portion of said top, said conduit having a bend therein between said flange and said plate, and a gasket of deformable material positioned in said recess and around said port.

7. In combination with an oil filter having a separable relatively thin body and relatively thick cup-shaped top, a mounting bracket having a plate defining an aperture, said top being permanently secured to said plate and with the cupped portion of said top extending through said aperture, a mounting flange bent normally from said plate, side flanges connecting said plate and said mounting flange, a pressed out portion in said mounting flange defining a port and a recess therearound, a conduit connected to said flange and extending from said port through said plate and through said top, said conduit having a bend therein between said flange and said plate, and a gasket of deformable material positioned in said recess and around said port.

8. In combination with an oil filter having a separable body and cup-shaped top, a mounting bracket having a plate defining an aperture, said top being permanently secured to said plate and with the cupped portion of said top extending through said aperture, a mounting flange bent from said plate, a pressed out portion in said mounting flange defining a port and a recess therearound, a conduit connected to said flange and extending from said port through said plate and said cover, said conduit having a bend therein between said flange and said plate, and a gasket of deformable material positioned in said recess and around said port.

9. An oil filter comprising a relatively light gauge container member, a relatively heavy gauge cover member, a stamped bracket having a horizontal flange permanently secured to one of said members, a vertical flange on said bracket also permanently attached to said one member, an attaching flange bent from said horizontal flange and defining a pair of ports and arranged to be connected to an engine block, a reinforcing ring mounted within the open end of said container member, a spider member engageable with said ring, screw means extending between said spider and said cover member for clamping said container member and cover member together, and oil conduits extending from said ports through said horizontal flange and one of said members to within said filter.

10. An oil filter comprising a relatively light gauge container member, a relatively heavy gauge cover member having an annular sealing portion with a central dome-shaped portion with a cylindrical side wall, a reinforcing rib formed in said cover between said sealing portion and said dome-shaped portion, a reinforcing ring secured within the open end of said container and having lugs pressed inwardly therefrom, a partition having a cylindrical flange secured within the side wall of said dome-shaped portion, said partition having a downwardly concave pocket, a spider having arms adapted to be engaged below said lugs, a screw extending through said dome portion and partition and engageable with said spider, an attaching bracket having a horizontal flange permanently secured to said sealing portion of said cover member and a central cylindrical flange permanently secured to said cylindrical side wall, an attaching flange on said bracket, said attaching flange having an embossed portion defining a pair of ports with a recess therearound on the back side of said attaching flange, a pair of conduits connected to said ports and extending through said horizontal flange and said cover member, one of said conduits extending through said dome-shaped portion of said cover member above said partition, the other of said conduits extending through said reinforcing rib in said cover member between said partition and said sealing portion, a deformable gasket positioned around said screw to be compressed between said spider and said pocket in said partition to seal said screw to said partition, and a gasket positioned between said sealing portion of said cover and the open end of said container.

11. An oil filter comprising a container member, a cover member having an annular sealing portion and a central dome-shaped portion with a cylindrical side wall, a reinforcing ring secured within the open end of said container and having lugs pressed inwardly therefrom, a partition having a cylindrical flange secured within the side wall of said dome shaped portion, said partition having a downwardly concave pocket, a spider having arms adapted to be engaged below said lugs, a screw extending through said dome portion and partition and engageable with said spider, an attaching bracket having a horizontal flange permanently secured to said sealing portion of said cover member, an attaching flange on said bracket, said attaching flange having an embossed portion defining a pair of ports with a recess therearound on the back side of said attaching flange, a pair of conduits connected to said ports and extending through said horizontal flange and said cover member, one of said conduits extending through said dome shaped portion of said cover member above said partition, the other of said conduits extending through said cover member between said partition and said sealing portion, a deformable gasket positioned around said screw to be compressed between said spider and said pocket in said partition to seal said screw to said partition, and a gasket positioned between said sealing portion of said cover and the open end of said container.

12. An oil filter comprising a container member, a cover member having an annular sealing portion with a central dome-shaped portion, a reinforcing ring secured within the open end of said container and having lugs pressed inwardly therefrom, a partition secured within the dome-shaped portion of said cover, a spider having arms adapted to be engaged below said lugs, a screw extending through said dome portion and partition and engageable with said spider, an attaching bracket formed as a stamping and having a horizontal flange permanently secured to said sealing portion of said cover member, an attaching flange having an embossed portion defining a pair of ports with a recess therearound on the back side of said attaching flange, a pair of conduits connected to said ports and extending through said cover member, a deformable gasket positioned around said screw to be compressed between said spider and said partition to seal said screw to said partition, and a gasket positioned between said sealing portion of said cover and the open end of said container.

JAMES W. WILKINSON.

REFERENCES CITED

The following references are of record in the file of this patent:

UNITED STATES PATENTS

| Number | Name | Date |
|---|---|---|
| Re. 17,644 | Manning | Apr. 15, 1930 |
| 1,258,166 | Vollmann | Mar. 5, 1918 |
| 1,518,980 | Gish | Dec. 9, 1924 |
| 2,059,358 | Johnson et al. | Nov. 3, 1936 |
| 2,110,124 | Fitzgerald | Mar. 8, 1938 |
| 2,208,620 | Baisch | July 23, 1940 |
| 2,253,685 | Burckhalter | Aug. 26, 1941 |
| 2,333,890 | Russell | Nov. 9, 1943 |
| 2,354,238 | Wilkinson | July 25, 1944 |
| 2,357,572 | Baldwin | Sept. 5, 1944 |
| 2,381,141 | Russell | Aug. 7, 1945 |
| 2,475,833 | Gunn | July 12, 1949 |
| 2,533,266 | Kovacs et al. | Dec. 12, 1950 |